(12) United States Patent
Karl et al.

(10) Patent No.: US 6,685,769 B1
(45) Date of Patent: *Feb. 3, 2004

(54) AQUEOUS CARBON BLACK DISPERSIONS

(75) Inventors: Alfons Karl, Gründau (DE); Horst Kleinhenz, Grosskrotzenburg (DE); Werner Kalbitz, Rodenbach (DE); Gerd Tauber, Seligenstadt (DE); Andreas Stübbe, Aschaffenburg (DE); Johann Mathias, Kahl (DE)

(73) Assignee: Degussa-Huls AG, Weissfrauenstrasse (DE)

( * ) Notice: Subject to any disclaimer, the term of this patent is extended or adjusted under 35 U.S.C. 154(b) by 135 days.

This patent is subject to a terminal disclaimer.

(21) Appl. No.: 09/621,462

(22) Filed: Jul. 21, 2000

(30) Foreign Application Priority Data

Jul. 21, 1999 (DE) .......................................... 199 34 282

(51) Int. Cl.⁷ ........................ C09D 17/00; C09D 11/00; C09D 7/12
(52) U.S. Cl. ............................... 106/31.56; 106/31.89; 106/31.9; 524/156; 524/217
(58) Field of Search ................................ 524/156, 217; 106/31.56, 31.89, 31.9

(56) References Cited

U.S. PATENT DOCUMENTS

| | | | | |
|---|---|---|---|---|
| 4,959,661 A | 9/1990 | Buxton et al. | ............ | 106/31.65 |
| 5,085,698 A | 2/1992 | Ma et al. | | |
| 5,286,291 A | 2/1994 | Bernhardt et al. | .......... | 106/417 |
| 5,320,668 A | 6/1994 | Shields et al. | | |
| 5,538,548 A | 7/1996 | Yamazaki | | |
| 5,609,671 A | 3/1997 | Nagasawa | | |
| 6,171,382 B1 | 1/2001 | Stubbe et al. | ............ | 106/31.86 |

FOREIGN PATENT DOCUMENTS

| | | | | |
|---|---|---|---|---|
| DE | 19613796 | 10/1997 | | |
| JP | 62179541 A | 8/1987 | ............. | C08J/9/42 |
| WO | WO 96/37447 | 11/1996 | | |
| WO | WO 96/37547 | 11/1996 | | |
| WO | WO 98/42778 | 10/1998 | | |

Primary Examiner—Kelechi Egwim
(74) Attorney, Agent, or Firm—Pillsbury Winthrop LLP

(57) ABSTRACT

Aqueous carbon black dispersions contain carbon black and cationic and non-ionic surfactants in addition to water. The dispersions are produced by dispersing the carbon black and the other components in water with bead mills, ultrasonic mills or an Ultra Turrax mixer. The dispersions can be used to produce inks, lacquers and printing inks.

13 Claims, No Drawings

AQUEOUS CARBON BLACK DISPERSIONS

CROSS-REFERENCE TO RELATED APPLICATION

This application relates to German Application DE 199 34 282.2, filed Jul. 21, 1999, which disclosure is incorporated herein by reference.

FIELD OF THE INVENTION

The invention concerns aqueous, cationically/non-ionically stabilized carbon black dispersions, a method for their production and their use.

BACKGROUND OF THE INVENTION

Aqueous carbon black dispersions are used in formulations for printing inks and also directly as inks, for example, in inkjet printers.

The inkjet printing method is a known reproducing technology in which the printing ink is transferred without pressure, that is, without contact of the print head with the print medium. Droplets of ink are sprayed from a jet or nozzle onto a receiving material during which deflection of the droplets can be electronically controlled. This technology, also known as pressureless printing, is particularly suitable for printing products having irregular surfaces and packaging because there is a certain distance between the print head and the printed material. The printing method is very flexible and relatively economical and is therefore also used in computer printing, for example, as a workplace printer. The inkjet method is also increasingly used in the industrial field, for example, in outside advertising. In outside advertising, the ink must meet special requirements of light-fastness and water resistance. In addition, the color components must be very finely divided to prevent printing jets from clogging. Both dyes as well as, more recently, pigments have been used as coloring substances. Pigments have the advantage over dyes that the light-fastness of pigments is very high and that pigments are water-resistant. Pigments have a disadvantage in comparison to dyes, namely that they only form stable dispersions with a long storage life when treated with surface-active substances (surfactants). Pigment particles are not present in the form of primary particles but rather in the form of aggregates. Pigment aggregates are larger than soluble dyes. If pigment aggregates are not sufficiently finely dispersed, they clog the jets of printing heads. Moreover, large aggregates alter the light absorption properties of the pigment black. The result is a graying of the print and a loss of covering power.

Early patents that disclose the use of carbon blacks as pigment blacks in inkjet inks are U.S. Pat. No. 5,085,698 and U.S. Pat. No. 5,320,668. The use of water-soluble acrylates for pigment stabilization is described therein.

The production of aqueous carbon black dispersions with carbon blacks having an average primary particle size of not greater than 30 nm and a DBP No. of at least 75 ml/100 g is known from U.S. Pat. No. 5,538,548.

The production of aqueous carbon black dispersions using water-soluble organic solvents and water-soluble acrylic resins is also known (U.S. Pat. No. 5,609,671).

A disadvantage of the known aqueous carbon black dispersions is running or bleeding after they have been sprayed onto a carrier. Commercial dispersions have zeta potentials <0 mV. A purposeful flocculation of the dispersion during or after its application onto the carrier can be readily achieved by positive surface charging of the dispersed particles (zeta potentials >0 mV), which counteracts bleeding.

SUMMARY OF THE INVENTION

Therefore, it is an object of the invention to produce carbon black dispersions that do not have the disadvantages mentioned above and that, in addition, are stable during storage.

The invention has as its subject matter aqueous carbon black dispersions containing the following components in addition to water relative to the total dispersion:

Carbon black: 1 to 45% by weight, preferably 5 to 25% by weight;

Cationic surfactant: 1 to 40% by weight, preferably 5 to 25% by weight; and

Non-ionic surfactant: 0.5 to 10% by weight, preferably 2 to 10% by weight.

At least one compound from the following group can be used as cationic surfactant:

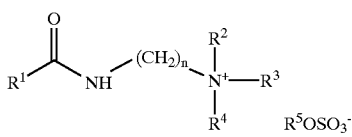

$R^1$—COOH: ricinoleic acid $R^2$, $R^3$, $R^4$: can be identical or different and consist of $C_1$ to $C_5$ alkyl groups or

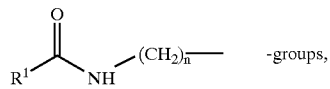

-groups, $R^5$: $C_1$ to $C_5$ alkyl groups, n: natural number 1–5,

Akypoquat 132 (cationic fatty ester (CTFA: Lauroyl PG-trimonium chloride)) of the Kao Chemicals GmbH Company, Bayowet FT 738 VP AC 2023 (quaternary fluoroalkyl ammonium iodide) of the Bayer AG Company, DP2-7949 (aqueous solution of cationic homopolymers) of the Ciba Geigy Chemicals Company, DP 7-7961 (aqueous solution of cationic polymers) of the Ciba Geigy Chemicals Company, DP 7-7962 (aqueous solution of cationic polymers) of the Ciba Geigy Chemicals Company, DP 7-7963 (aqueous solution of cationic polymers) of the Ciba Geigy Chemicals Company, Epikuron 200 (phosphatidyl choline) of the Lukas Meyer Company, ethoxamine SF11 (ethoxylated fatty amine with 11 moles ethylene oxide) of the Witco Company, ethoxamine SF 15 (ethoxylated fatty amine with 15 moles ethylene oxide) of the Witco Company, Forbest 13 (neutral compound, acidic polyester and fatty alcohol) of the Lukas Meyer Company, Forbest 610 (carboxylic acid-diamine preparation) of the Lukas Meyer Company, Magnafloc 1797 (aqueous solution of cationic cross-linked condensation resins) of the Ciba Specialty Chemicals Company, Protectol KLC 50 (dimethyl-C 12/14-alkylbenzyl ammonium chloride in water (approximately 50%)) of the BASF Company, Rewoquat CPEM (coconut ethoxymethyl- ammoniumthiosulfate) of the Witco Surfactants GmbH Company, Rewoquat RTM 50 (ricinoleic acid propylamidotrimethylammonium methosulfate) of the Witco Surfactants GmbH Company, Sochamines 35 (alkylimidazoline) of the Witco Surfactants GmbH Company.

In one embodiment the cationic surfactant can be a wetting agent combination or a mixture of at least two cationic wetting agents.

At least one compound from the group of cross-linked polyoxyethylene acrylic acid, fatty alcohol oxyethylates, nonylphenolpolyglycol ether, polyvinylpyrrolidone, glycerol fatty acid ester, propyleneglycol fatty acid ester, sorbitan fatty acid ester, polyoxyethylene sorbitan fatty acid ester, tetraoleic acid, polyoxyethylene sorbitol, polyoxyethylene alkyl ether, polyoxyethylenealkylphenyl ether, polyoxyethylenepolyoxypropylene glycol, polyoxyethylenepolyoxypropylene alkyl ether, polyethyleneglycol fatty acid ester, higher fatty acid alcoholic esters and polyhydric alcoholic fatty acid esters can be used as non-ionic surfactants.

The dispersion can contain a mixture of at least two non-ionic wetting agents in a preferred embodiment.

Pigment blacks with an average primary particle size of 8 to 80 nm, preferably 10 to 35 nm and a DBP number of 40 to 200 ml/100 g, preferably 60 to 150 ml/100 g can be used as the carbon black. Pigment blacks produced by means of furnace black methods, gas black methods, channel black methods or flame black methods can be used as the carbon blacks. Examples thereof are color black FW 200, color black FW 2, color black FW 2 V, color black FW 1, color black FW 18, color black S 170, color black S 160, special black 6, special black 5, special black 4, special black 4A, Printex 150 T, Printex U, Printex V, Printex 140 U, Printex 140 V, Printex 95, Printex 90, Printex 85, Printex 80, Printex 75, Printex 55, Printex 45, Printex 40, Printex P, Printex 60, Printex XE 2, Printex L 6, Printex L, Printex 300, Printex 30, Printex 3, Printex 35, Printex 25, Printex 200, Printex A, Printex G. special black 550, special black 350, special black 250, special black 100, manufactured by Degussa Hüls AG, Germany. In a preferred embodiment of the invention gas blacks are used.

In a further embodiment, carbon blacks containing Si and known from DE 19613796, WO 96/37447 and WO 96/37547 and metal-containing carbon blacks known from WO 98/42778 can be used.

The carbon black dispersed in the dispersion can have an average particle size of 50 to 250 nm in an embodiment of the invention.

Further subject matter of the invention is constituted by a method of producing the aqueous carbon black dispersion that is characterized in that carbon black is dispersed together with the wetting agent or wetting agents in water and that bead mills, ultrasonic devices or an Ultra-Turrax mixer are used if necessary for the dispersal. Following the dispersal the carbon black dispersion can be centrifuged or filtered.

The pH of the dispersions can be in the acidic range, preferably in a range of pH of 1–4.

The dispersions in accordance with the invention have a very high flocculation stability in the acidic pH range and therewith high stability during storage.

The carbon black dispersions in accordance with the invention have conventional optical density.

The aqueous carbon black dispersions in accordance with the invention can be used for producing inks, lacquers and printing inks, in particular inks for inkjet printers.

EXAMPLES

The carbon black dispersions in accordance with the invention are produced as follows:

1. Preparation of the Wetting Agent Solution

Water is placed in a receiver, non-ionic wetting agent LUTENSOL AO 30 is dissolved under heating to at the most 60° C. and cooled down under agitation.

2. Working in the Carbon Black

The carbon black is worked gradually into a prepared wetting agent solution under slow agitation, either by hand or with a slow agitator. If a noticeable elevation of consistency occurs during the addition of the carbon black, the cationic surfactant is supplied. Otherwise, the cationic surfactant is not added until after the carbon black has been worked in during the dispersal.

3. Dispersal

Ultrasonic devices may be used.

The dispersion prepared according to paragraph 2, above, is homogenized with a high-performance mixer (e.g., an Ultra Turrax mixer) and dispersed with an ultrasonic device. Very coarse particles can be separated from the dispersion obtained in this manner, using a centrifuge.

The composition of the aqueous carbon black dispersions as well as their properties are given in Tables 1 and 2. The Tables also show that the aqueous carbon black dispersions in accordance with the invention have good stability in storage.

TABLE 1

| Example No.<br>Dispersal: Ultrasound | 1 | 2 |
|---|---|---|
| Constituents | | |
| PRINTEX 90 | 15 | — |
| Color black FW 18 | — | 15 |
| LUTENSOL AO 30 | 4 | 4 |
| REWOQUAT RTM 50 | 6 | 6 |
| Water | 75 | 75 |
| Total | 100 | 100 |
| Surface tension mN/m | 40.5 | 39.6 |
| Average particle size nm | 82 | 113 |
| Optical density (5% black/15% TEG) | 1.46 | 1.48 |
| My | 150 | 151 |
| Mc | 152 | 153 |
| Zeta potential mV | +10 | +8 |
| PH | 2.7 | 2.3 |
| Stability | | |
| Viscosity, 1 day cPs | 22 | 25 |
| Viscosity, 28 days cPs | 28 | 34 |

TABLE 2

| | Formulation 1 | | | Formulation 2 | | |
|---|---|---|---|---|---|---|
| | 15% FW 18 | | | 15% PRINTEX 90 | | |
| | 4% LUTENSOL AO 30 | | | 5% LUTENSOL AO 30 | | |
| | 75% distilled Water | | | 74% distilled Water | | |
| | 6% cationic surfactant | | | 6% cationic surfactant | | |
| Cationic Wetting Agent | Evaluation with light microscope Formulation 1 | Evaluation with light microscope Formulation 2 | Storage 50° C., 3 d Formulation 1 | Storage 50° C., 3 d Formulation 2 | Zeta potential [mV] Formulation 1 | Zeta potential [mV] Formulation 2 |
| DP2-7949 | Ok | Ok | Ok | Ok | not determined | +18 |
| DP7-7961 | Ok | Ok | Ok | Ok | +3.0 | +2.9 |
| DP7-7962 | Ok | Ok | Ok | Ok | +2.7 | +3.2 |
| DP7-7963 | Ok | Ok | Ok | Ok | +4.2 | not determined |
| Magnafloc 1797 | Ok | Ok | Ok | Ok | +2.6 | +2.3 |

The evaluation with a light microscope takes place after the production and after three days in a drying oven at 50° C.

The surface tension is determined by the plate (sheet) method according to DIN 53 914 (3/80) at 20° C. The surface tension of the carbon black dispersion is significant in as far as a high surface tension has a positive influence on the formation of droplets leaving the jet in the inkjet process.

The zeta potential is determined with an MBS-8000 from the Matec Company. The specimens are measured undiluted. The zeta potential is determined by electrokinetic sound amplitude (ESA). The zeta potential, that characterizes the charge state of the particle surface, provides information about the wetting agent used for the stabilization. In the case of cationic wetting agents the zeta potential is greater than 0 mV, preferably greater than or equal to 10 mV. In the case of non-ionic wetting agents the zeta potential is usually approximately $\leq 0$ mV.

The distribution of particle size is determined by means of dynamic light scatter (photon correlation spectroscopy, PCS). A photon correlation spectrometer NICOMP N370 (Hiac/Royco Company) is used as the spectroscopy device. The measurement takes place in ultrapure water. The evaluation takes place by means of Gauss distribution analysis (volume distribution).

The optical density is determined with a Mcbeth RD 918 densitometer on test prints produced on a 660 C Hewlett-Packard printer.

The stability test is carried out as follows:
The dispersion is stored 28 days at room temperature, then frozen down to —30° C. and heated up to 70° C.

The examples show a high flocculation stability and therewith a high stability during storage apparent from the low rise of viscosity over 28 days (room temperature) and from the high zeta potential. The color values are in the normal range. The particle sizes in the dispersion are at the level of aggregate size and are thus an indication for a good dispersion stability by means of the cationic/non-ionic wetting agent combination.

The viscosity measurements are carried out with a Brookfield model DV II.

The components used in the production of the carbon black dispersions are characterized as follows:

The carbon black PRINTEX 90 is a furnace black with an average primary particle size of 14 nm and a DBP absorption of 95 ml/100 g.

The carbon black designated color black FW 18 is a gas black with an average primary particle size of 15 nm.

REWOQUAT RTM 50 is a cationic wetting agent.

Producer: Witco Company

Substance group: ricinoleic acid propylamidotrimethylammonium methosulfate

Formula:

$$R^1 \underset{NH}{\overset{O}{\|}} (CH_2)_3 \underset{CH_3}{\overset{CH_3}{N^+}} CH_3 \quad CH_3OSO_3^-$$

$R^1$—COOH: Ricinoleic acid

MAGNAFLOC 1797 is a cationic wetting agent
  Producer: Ciba Specialty Chemicals
  Substance group: Aqueous solution of cationic, cross-linked condensation resins.

DP2-7949 is a cationic wetting agent
  Producer: Ciba Specialty Chemicals
  Substance group: Aqueous solution of cationic homopolymers.

DP7-7961 is a cationic wetting agent
  Producer: Ciba Specialty Chemicals
  Substance group: Aqueous solution of cationic polymers.

DP-7962 is a cationic wetting agent
  Producer: Ciba Specialty Chemicals
  Substance group: Aqueous solution of cationic polymers.

DP7-7963 is a cationic wetting agent
  Producer: Ciba Speciality Chemicals
  Substance group: Aqueous solution of cationic polymers.

Forbest 13 is a cationic wetting agent
  Producer: Lukas Meyer
  Neutral compound, acidic polyester and fatty alcohol.

Lutensol AO 30 is a non-ionic wetting agent
  Producer: BASF
  Substance group: Non-ionic
    Fatty alcohol oxethylate with 30 units of ethylene glycol.

What is claimed is:
1. An aqueous carbon black dispersion comprising:
  5% to 97.5% by weight of water,
  1% to 45% by weight of carbon black,

1% to 40% by weight of cationic surfactant, and
0.5% to 10% by weight of non-ionic surfactant,
wherein the cationic surfactant is

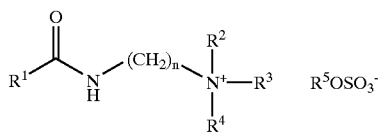

wherein
R$^1$—CO— represents a ricinoleic acid moiety,
R$^2$, R$^3$, R$^4$ may be identical or different substituents and are selected from the group consisting of C$_1$ to C$_5$ alkyl groups and

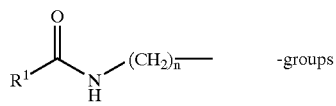 -groups

R$^5$ represents C$_1$ to C$_5$ alkyl groups, and
n represents a natural number 1–5.

2. The aqueous carbon black dispersion according to claim 1, wherein the non-ionic surfactant comprises at least one compound selected from the group consisting of fatty alcohol oxyethylates, nonylphenolpolyglycol ether, polyvinylpyrrolidone, glycerol fatty acid ester, propyleneglycol fatty acid ester, sorbitan fatty acid ester, polyoxyethylene sorbitan fatty acid ester, polyoxyethylene sorbitol, polyoxyethylene alkyl ether, polyoxyethylenealkylphenyl ether, polyoxyethylenepolyoxypropylene glycol, polyoxyethylenepolyoxypropylene alkyl ether, polyethyleneglycol fatty acid ester, higher fatty acid alcoholic esters polyhydric alcoholic fatty acid esters, ethoxylated fatty amine with 11 moles ethylene oxide, and ethoxylated fatty amine with 15 moles ethylene oxide.

3. The aqueous carbon black dispersion according to claim 1, wherein the carbon black is a pigment black with an average primary particle size of 8 to 80 nm and a DBP No. of 40 to 200 ml/100 g.

4. The aqueous carbon black dispersion according to claim 1, wherein the carbon black is present in an amount of 5 to 25% by weight relative to total dispersion weight.

5. The aqueous carbon black dispersion according to claim 1, wherein the carbon black is present in an amount of 5% to 25% by weight relative to total dispersion weight.

6. The aqueous carbon black dispersion according to claim 1, wherein the cationic surfactant is present in an amount of 5% to 25% by weight relative to total dispersion weight.

7. The aqueous carbon black dispersion according to claim 1, wherein the cationic surfactant further comprises a wetting agent or a mixture of at least two cationic wetting agents.

8. A method of producing an aqueous carbon black dispersion according to claim 1 comprising:
dispersing the carbon black, the cationic surfactant and the non-ionic surfactant in water.

9. The method of producing the aqueous carbon black dispersion according to claim 8, wherein the aqueous carbon black dispersion is centrifuged or filtered.

10. A composition comprising the aqueous carbon black dispersion according to claim 1, and a member selected from the group consisting of inks and lacquers.

11. The composition according to claim 10, wherein the inks comprise printing inks.

12. The composition according to claim 11, wherein the inks comprise inks for inkjet printers.

13. The method of producing an aqueous carbon black dispersion according to claim 8, wherein the carbon black, the cationic surfactant, and the non-ionic surfactant are dispersed in water using bead mills, ultrasonic devices, or high-performance mixers.

* * * * *